GAIN-CONTROL CIRCUIT FOR STEREOPHONIC RADIO RECEIVERS
Filed Nov. 7, 1960
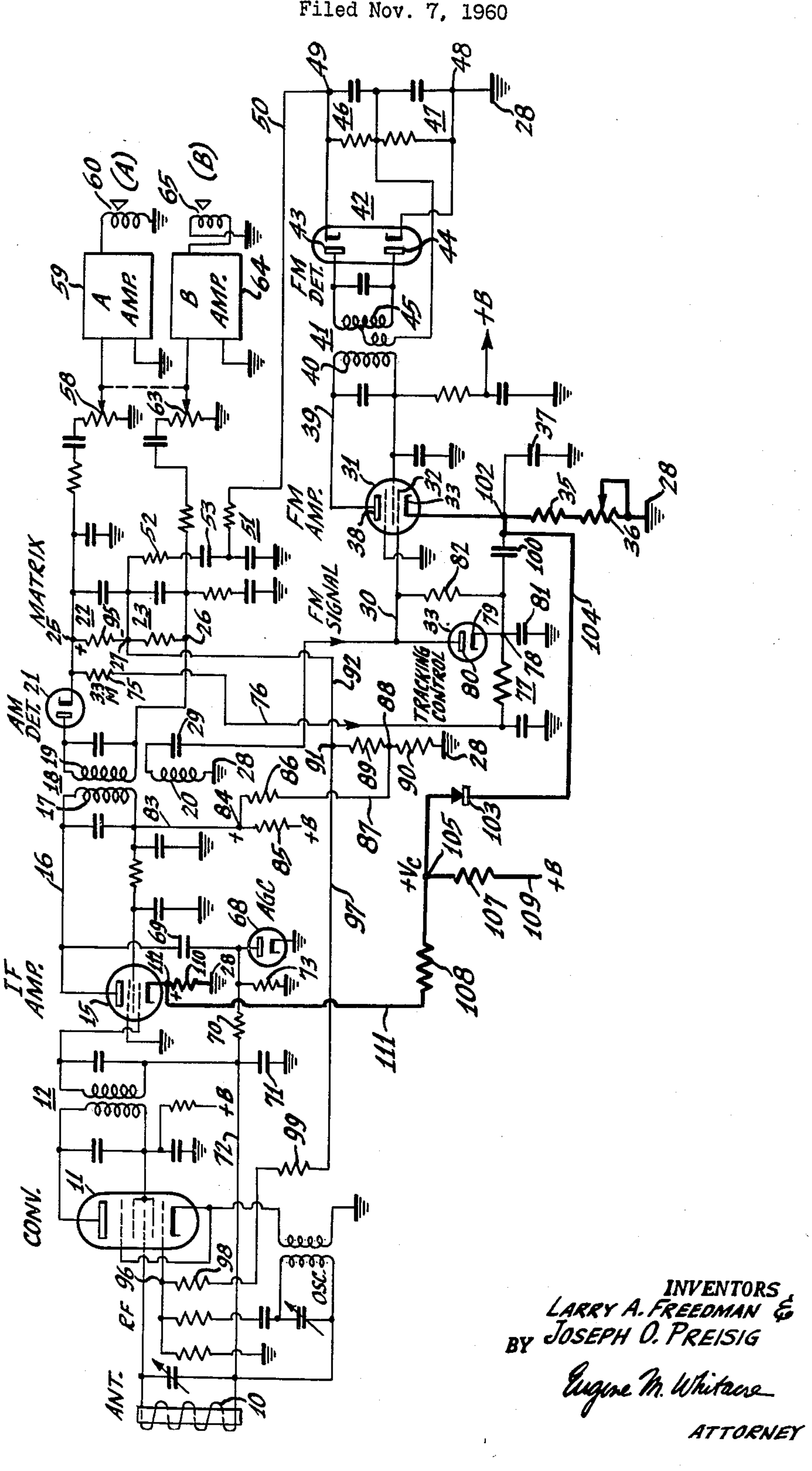
INVENTORS
LARRY A. FREEDMAN &
JOSEPH O. PREISIG
BY Eugene M. Whitacre
ATTORNEY 3,061,683
Patented Oct. 30, 1962

3,061,683

GAIN-CONTROL CIRCUIT FOR STEREOPHONIC RADIO RECEIVERS

Larry A. Freedman, East Brunswick, and Joseph O. Preisig, Trenton, N.J., assignors to Radio Corporation of America, a corporation of Delaware Filed Nov. 7, 1960, Ser. No. 67,764
11 Claims. (Cl. 179—15)

This invention relates to stereophonic radio signal receivers for carrier waves which are amplitude modulated in accordance with one of a pair of stereophonically-related sound signals, and concurrently angle or frequency modulated in accordance with the other of said pair of stereophonically-related signals.

The stereophonically-related sound signals, designated as A and B signals, for modulating the carrier-wave or signal are normally matrixed to form an $(A-B)$ signal which is used to angle or frequency-modulate the carrier wave, and an $(A+B)$ signal which is used to amplitude modulate the angle-modulated carrier wave. A conventional monophonic (AM) radio receiver may then receive the modulated signal or carrier wave and detect the $(A+B)$ sound signal as conventional amplitude modulation.

A stereophonic receiver for such modulated carrier waves includes separate amplitude and angle or frequency-modulation channels with detector circuits for demodulating, or detecting, the amplitude-modulation and angle-modulation signals $(A+B)$ and $(A-B)$. To recover the individual stereophonically-related A and B signals, the detected $(A+B)$ and $(A-B)$ signals are added and subtracted in a suitable matrixing circuit or network as is known. The resultant signals are then amplified in separate A and B, or left and right, stereophonic, signal channels of the receiver and reproduced in stereophonic relation through individual spaced, left and right, loudspeaker means for the respective signal channels.

More particularly, the present invention relates to radio signal receivers of the type described having means for maintaining the tracking of, or a predetermined amplitude ratio between, the detected $(A+B)$ and $(A-B)$ signals from the separate angle-modulation and amplitude-modulation channels thereof, through signal-responsive control of limiter amplifier means in the angle or frequency-modulation channels. Such a receiver is shown and described in our copending application for Limiter Control System for Stereophonic Radio Receiver, Serial No. 66,510, filed concurrently herewith and assigned to the same assignee as that of this application.

In the receiver of this concurrently filed application which provides for carrier waves or signals modulated in both angle, or frequency, and amplitude with stereophonic information, the angle or frequency modulation channel includes a limiter amplifier circuit followed by an angle or frequency modulation detector circuit. Variation or control of the amplitude of the output $(A-B)$ signal of the angle-modulation detector circuit is provided by a tracking control circuit connected with the limiter amplifier circuit and including means providing a control or tracking voltage which is responsive to variations in the signal strength or average amplitude of the received carrier wave, thereby to track with the output $(A+B)$ signal of the amplitude-modulation channel in predetermined relation for proper matrixing at all signal levels. Thus the limiter control circuit referred to operates to maintain a substantially constant amplitude relation in the signal output from the amplitude modulation and the angle or frequency modulation channels and independent of variations in the strength of the received modulated signal.

It has been found that in a stereophonic receiver with separate amplitude and angle or frequency modulation channels, reduced angle or frequency modulation channel gain, under weak signal conditions, is desirable for reducing noise effects in the signal output. In effect, this reduces the stereophonic sound separation because of the reduction or elimination of the angle or frequency-modulation (FM) $(A-B)$ component in the matrixing circuits. However, under low signal conditions the stereophonic effect is of less importance than the noise effects which result with low signal output from the FM or angle-modulation channel. In other words, in stereophonic radio signal receivers of the type described, under weak signal conditions, undesirable noise effects are present and should be reduced or eliminated for best operating results.

It is therefore an object of this invention to provide an improved FM or angle modulation channel gain-control circuit, for stereophonic radio receivers of the type having amplitude modulation and FM or angle modulation signal channels, which operates to provide reduced angle-modulation channel gain under weak signal conditions, thereby to reduce the noise effects above mentioned.

It is also a further object of this invention to provide an improved FM or angle modulation control circuit, for stereophonic radio receivers adapted for and having separate amplitude-modulation and FM or angle modulation signal channels, which operates in conjunction with variable tracking control means for the channel output signals to provide reduced angle modulation channel gain and output under weak signal conditions of operation of the receiver.

In a stereophonic radio signal receiving system for carrier signals modulated in both angle and amplitude with stereophonic sound-signal information, for operation in accordance with the invention, an automatic-gain-controlled intermediate frequency amplifier is provided and coupled with an amplitude-modulation signal channel having an envelope detector and with an angle or frequency modulation channel having angle or frequency modulation detector means therein. Separate amplitude and angle or frequency modulation signal channels are thus provided in the system, and the angle or frequency modulation channel includes a limiter amplifier circuit preceding the detector means. Variation in the output $(A-B)$ signal level of the angle modulation detector is provided by a variable control voltage supplied by a tracking control circuit connected with the limiter amplifier circuit in the angle or frequency-modulation channel, and operative in such a manner that the $(A-B)$ signal translated through the channel is varied in amplitude to track the output $(A+B)$ signal from the AM envelope detector, as the signal strength of the received carrier wave varies, and provide proper matrixing of the signals for deriving the stereophonic A and B sound signals in balanced relation. For weak signal levels the desired tracking is obtained by a reduction in FM channel gain.

To reduce or eliminate the undesired noise effects in a receiver of this type, in accordance with the invention, the gain of the limiter amplifier in the angle or frequency modulation channel is additionally controlled in response to variations in the average amplitude in the received signal whereby under weak signal conditions, the angle or frequency modulation channel gain is substantially reduced or cut off. This is accomplished, in accordance with the invention, by connecting variable conduction means, such as a rectifier from the cathode of an electronic amplifier tube in the limiter amplifier to a suitable source providing a positive reference or control voltage. This voltage may be fixed, but preferably is variable in response to variations in the average amplitude of the received signal for more effective control of the channel gain and noise effects. In one embodiment of the invention, therefore, it is referred to the positive cathode potential of one of the intermediate frequency amplifier stages which is under automatic gain control.

The limiter amplifier tube is provided with a cathode resistor having a cathode terminal which is positive with respect to ground for the system and decreases in voltage in response to a decreased tracking control voltage and decreased average amplitude of an applied signal. The diode conducts when the voltage at the cathode terminal falls below that of the positive control voltage source or positive potential supply level. Due to additional current flow to the cathode resistor, the limiter amplifier tube is then provided with more grid-cathode bias voltage than would be normally applied and this results in a more rapid reduction of the channel gain at low signal levels. The diode is cut off for all signal input above a predetermined level. For decreasing input signal amplitude below this level, the diode conducts thereby increasing the bias in the limiter amplifier tube to reduce the gain.

In a modification of the invention, the positive reference voltage source may be a positive supply circuit terminal in the intermediate-frequency amplifier, such as the cathode terminal of a self-bias resistor of an electronic amplifier tube, which varies in voltage in response to signal strength variations generally through operation of the automatic-gain-control means. This results in an even more rapid increase in bias on the limiter amplifier, thereby causing the desired reduction in channel gain under low signal condition, but more rapidly than without the added intermediate-frequency-amplifier control action.

The invention will, however, be further understood from the following description when considered in connection with the accompanying drawing.

In the drawing, the sole FIGURE is a schematic circuit diagram of a stereophonic signal receiver of the type having amplitude and angle-modulation channels and provided with a control system embodying the invention.

Referring to the drawing, the stereophonic two-channel receiver shown includes signal pickup means represented by a loop antenna 10 which is coupled to a tunable signal converter means 11. The intermediate-frequency (IF) signal output from the converter means is applied through an IF coupling transformer 12 to an IF amplifier including an amplifier tube 15 having an output circuit 16. The output circuit is connected with the tuned primary winding 17 of an IF ouput coupling transformer 18 which has a secondary winding 19 and a tertiary winding 20.

The transformer 18 provides for dividing the amplitude-modulation and the angle or frequency-modulation channels in the receiver. In the present example, the secondary winding 19 is connected to the amplitude-modulation channel and the envelope detector therein which is provided by a diode 21. The amplitude-modulation detector circuit includes the diode connected across the secondary winding in series with resistor-capacitor networks 22 and 23 providing first and second envelope detector load circuits. The load circuit 22 provides the $(A+B)$ modulation component at an output terminal 25 with respect to common ground for the system, while the $-(A+B)$ modulation component is provided at an output terminal 26 for the load circuit 23 with respect to said ground. The two load circuits 22 and 23 are effectively serially connected between the terminals 25 and 26 and provided with a common terminal 27 at the junction thereof.

The tertiary winding 20 is connected with the angle or frequency-modulation channel to supply the IF signal thereto. One end of this tertiary winding is connected to chassis or common ground 28 for system. The opposite end of the winding 20 is coupled through a capacitor 29 to the input circuit 30 of a limiter amplifier. This limiter amplifier includes an amplifier device 31 and a clamping diode 33 in shunt relation to the input circuit. The amplifier device 31 may be of the electron-tube pentode type shown, having an input or control grid 32 connected with the input circuit 30 and a cathode 33 connected to common or chassis ground 28 through cathode resistor means. The latter includes a fixed resistor section 35 and a variable resistor section 36 in series therewith, and for which the bypass capacitor 37 is provided.

The anode 38 is connected through an output circuit 39 to the tuned primary winding 40 of a discriminator transformer 41 which drives a conventional angle or frequency-modulation detector 42. The detector 42 includes a pair of diodes 43 and 44 with their anodes connected with opposite ends of the tuned secondary winding 45 of the discriminator transformer 41. The load circuit for the diodes 43 and 44 comprise a pair of resistor-capacitor networks 46 and 47 connected in series between the cathodes thereof. One terminal 48 of the load circuit is connected to chassis or common ground 28 for the system, and the other end terminal 49 of the load circuit is connected through an output circuit 50 and a de-emphasis network 51 with the junction of the envelope detector load circuit 22 and 23 effectively at the terminal 27. A series isolating resistor 52 and coupling capacitor 53 are connected between the de-emphasis network 51 and the terminal 27 as shown.

The angle or frequency modulation $(A-B)$ output signal at the terminal 49 is applied through the above connection to the amplitude-detector output circuit at the terminal 27 where the two output signals are combined, in an effective matrix, to provide the A signal component at the output terminal 25 and the —B signal component at the output terminal 26. Thus the $(A-B)$ signal is derived, or detected, from the angle or frequency modulation of the carrier wave, and the $(A+B)$ signal is derived, or detected, from the amplitude modulation of the carrier wave. The matrixing of these two detected signals is accomplished by the interconnection of the angle and amplitude modulation detectors.

From the terminal 25 of the channel A signals are translated through a separate output which includes variable-gain or volume-control means 58 connected to a suitable channel amplifier 59, which in turn is coupled to sound-reproducing or loudspeaker means 60 for the channel. Likewise the terminal 26 for the channel B signals is coupled to a second variable-gain or volume-control means 63, ganged with the first one as indicated, having connection with a suitable channel amplifier 64, which in turn is coupled to the channel sound-reproducing or loudspeaker means 65. The correct loudspeaker phasing is obtained preferably by reversing the polarity of the signal output connection at a suitable point in one channel, as indicated for channel B at the loudspeaker means 65.

It will be noted that the receiving system includes automatic-gain-control (AGC) means comprising a diode rectifier 68 coupled through a capacitor 69 to the IF output circuit 16 and connected through a filter resistor 70, provided with a shunt filter capacitor 71, to the AGC circuit lead 72 for the converter 11 and the IF amplifier 15. The load resistor 73 for the AGC diode 68 is connected between the diode anode and chassis or common ground, as indicated. This AGC circuit provides gain control by increasing the negative bias on the converter and IF amplifier tubes with increased signal strength at the IF circuit 16, corresponding to increased signal strength in the received signal.

In this receiving system, tracking control of the channel output signals is provided by varying the signal translation through the limiter amplifier in the angle or frequency modulation channel in accordance with variations in the received signal strength as translated into control voltages derived from two signal responsive sources in the receiver. One signal-variable positive tracking control voltage component is obtained at the amplitude-modulation detector output circuit 22 at the terminal 25 which is a positive potential point. This is connected through a decoupling resistor 75, a connection lead 76 and a filter network 77, with the terminal 78 of the cathode 79 of the clamping diode 33, the anode 80 of which is connected with the grid circuit 30 and the amplifier control grid 32. The cathode terminal 78 is bypassed to ground or chassis through a capacitor 81 which is part of the filter 77. A resistor 82 connected between the anode and cathode electrodes of the diode 33 serves to complete the D.C. current path for the diode.

A second signal-variable positive tracking control-voltage component for the limiter amplifier 31 is provided by the anode and screen supply circuit 83 of the IF amplifier tube 15 at the output terminal 84 of a series supply resistor 85 in the +B supply connection therefor. From the terminal 84 a connection is made with the diode cathode terminal 78 which may be traced through a series voltage-dropping resistor 86, and a circuit lead 87 to an intermediate terminal 88 between two series resistors 89 and 90 connected between a bias voltage supply terminal 91 and system ground or chassis 28. The terminal 91 is also connected through a lead 92 with the terminal 27 at the negative end of the AM-detector output circuit 22 in which a load resistor 95 provides a connection to the terminal 25 and thence through the resistor 75 and the circuit means connected therewith, as previously described, to the terminal 78.

A fixed negative bias voltage for the amplifier tube 31 is also applied to the terminal 91 and may be derived from any suitable fixed source, such as the oscillator grid circuit 96 of the converter 11, through a circuit lead 97 and two series decoupling resistors 98 and 99. The control circuit at the diode cathode terminal 78 is bypassed to the cathode 33 through a capacitor 100 for audio frequencies.

The operation of a diode-clamped limiter circuit of this type is shown and described in a copending application of Francis R. Holt entitled "Limiter," Serial No. 55,881, filed Sept. 14, 1960, and assigned to the assignee of this application. Briefly, the tube 31 is connected as a static or constant gain limiter. The diode 33 is connected in the grid circuit of the tube 31 to clamp the positive peaks of an applied signal at a level determined by the control voltage applied to the diode cathode terminal 78 from the tracking control circuit described. The limiter then operates between cut-off and the clamping level of the diode 33. As the diode cathode voltage becomes more positive with increasing signal strength, the positive signal peaks are clamped to a more positive voltage, thereby increasing the difference between the clamping and cut-off voltages. This permits a larger amplitude signal to be developed in the limiter output circuit, to maintain the desired tracking relation between the $A-B$ and $A+B$ signals in the matrixing circuits 22 and 23.

In the circuit described herein, starting with zero signal conditions, the angle or frequency modulation amplifier 31 is maintained at or near anode-current cutoff by an initial bias voltage on its grid. This bias voltage is the sum of the positive voltage from the plate-screen supply terminal 84 of the IF amplifier 15 and the negative voltage derived from the oscillator grid circuit 96 of the converter 11. This latter, negative voltage, appearing at the terminal 91, is applied to the amplifier control grid 32 through the circuit including the AM diode detector output resistor 95, the de-coupling resistor 75, the filter network 77 and the load resistor 72 for the clamping diode to effect a reverse AGC action.

As a received signal at the IF output circuit 16 increases in amplitude, the voltage developed by the AM diode detector 71 causes the D.-C. voltage at the cathode and the terminal 25 to become more positive. This more positive D.-C. voltage causes the cathode 79 of the clamping diode 33 to become more positive, thereby decreasing the negative bias on the channel amplifier tube 31, thus allowing for an increasing signal output from the amplifier and the angle or frequency modulation $(A-B)$ signal channel as is desirable for maintaining the proper tracking relation between the two output signals to be matrixed as hereinbefore described.

To aid in providing proper tracking at lower signal levels, the bias or control voltage from the AM detector source is initially supplemented by the other positive bias or control potential source which is in the IF amplifier. Referring to that circuit, the increase in received signal strength activates the automatic-gain-control circuit and reduces the anode and screen current of the amplifier tube 15. This causes an increase in positive voltage at the terminal 84 and this voltage is applied through the tracking control circuit to the grid of the amplifier 31 and the clamping diode to increase the signal gain through the channel and the signals applied to the FM detector and thence to the matrixing circuits. For higher signal levels, the AM detector circuit assumes control to a greater extent.

The linearity and gain of the amplifier 31 is controlled to some extent by the size of the cathode resistance which is determined by the setting of the variable resistor portion 36. Proper proportioning of the cathode resistance together with the tracking signal, provides both accurate and proper angle or frequency modulation channel gain. In any case, a cathode terminal 102 of the cathode resistor 35—36 is at a positive potential, with respect to common ground or chassis 28, which varies with variations in the strength of an applied signal because of the variable control or bias voltage applied to the amplifier 32 as hereinbefore described. While the clamping diode 33 operates to control the channel signal transmission, additional gain control is provided therefor in connection with the cathode bias resistor 35—36 through external current supply means connected therewith.

To reduce or eliminate the undesired noise effects in the receiver, in accordance with the invention, the gain of the limiter amplifier tube 31 in the angle or frequency-modulation channel is varied and separately controlled by additional means connected with the cathode terminal 102 of the bias resistor. Under weak signal conditions the current through this resistor is controlled to provide sufficient bias voltage to substantially cut-off the amplifier tube 31 and the signal transmission through the channel. The signal output from the receiver is then entirely through the amplitude modulation channel without matrixing and is therefore monophonic, comprising only the $(A+B)$ component. Thus, in the present receiver, under weak signal conditions, the noise effects are reduced and the sound reproduction is improved by reducing the stereophonic separation.

This reduced separation is accomplished, in accordance with the invention, by connecting a diode, such as a semiconductor diode 103, through a circuit connection 104 between the cathode or resistor terminal 102 of the amplifier tube in the limiter amplifier and a suitable source, such as a terminal 105, providing a positive reference or control voltage. This voltage may be fixed, but preferably is variable in response to variations in the average amplitude of the received signal, as is provided in the circuit shown.

The positive control or reference voltage for the terminal 105 is conveniently provided by connecting it to a voltage divider point constituted by the junction of two series connected voltage-divider resistors 107 and 108 connected between a positive operating-current supply lead 109 and a ground return to ground 28 which is the negative side of the operating current supply circuit for the system. In the present example, as a preferred arrangement, the ground return connection is provided through a cathode resistor 110 for the amplifier tube 15 in the intermediate-frequency amplifier. For this purpose the low potential end of the second resistor 108 is connected through a circuit lead 111 with the positive or cathode terminal 112 of the cathode resistor 110.

In the present example, the relative resistor values for the circuit shown includes a resistance of 82,000 ohms for the resistor 107, a resistance of 100 ohms for the resistor 108 and a resistance of 68 ohms for the resistor 110 with a normal low voltage supply source of about 150 volts at the supply lead 109. The diode 103 may be of the type known commercially as the 1N295, and is shown with the anode connected to the positive terminal 105 and the cathode connected with the cathode 33 to conduct in the direction of the terminal 102. The resistance values for the resistors 35 and 36 may be approximately 3000 and 5000 ohms respectively, the latter being variable as indicated. The foregoing resistor values are given only by way of example and will vary in accordance with the characteristics of the tubes and other circuit elements. In the present example, the amplifier tube 31 may be considered to be of the type known commercially as a 6EW6 tube, while the IF amplifier tube 15 is of the type known commercially as a 6BA6 tube.

In operation, the additional channel gain or noise-control circuit is such that for strong signals, the combination of the tracking signal from the control circuit of the system and the applied intermediate-frequency or frequency-modulation signal, at the circuit 30 and the grid 32 of the amplifier tube 31, causes a relatively large average anode current through the tube and the cathode resistor 35—36. The cathode of the tube and the terminal 102 is then more positive than the positive supply or reference voltage terminal 105, and the diode 103 is cut-off. For relatively low input signals, the cathode potential at the terminal 102 decreases in response to a decreasing tracking signal potential and decreased input signal, until the cathode potential at the terminal 102 is equal to the positive potential at the terminal 105. The diode 103 then conducts and tends to maintain the cathode 33 and the terminal 102 at the potential of the terminal 105. This causes additional current to flow through the cathode resistor 35—36 and the amplifier tube 31 to have more bias potential than would be the case in the absence of the diode 103 and its supply connections. This results in a more rapid reduction in the angle or frequency-modulation channel gain below a certain predetermined low signal level, as is desirable for noise reduction in the operation of the system.

The reduction in the angle or frequency modulation channel gain is further enhanced or increased by connecting the diode 103 supply circuit or voltage divider to the cathode or cathode terminal 112 of the intermediate frequency amplifier 15 which is under automatic gain control as hereinbefore described. The terminal 105 is made somewhat higher or more positive in potential than the cathode 112 so that the onset of diode conduction occurs at the proper signal level. The operation is improved over that provided by a fixed positive reference or control potential because as the applied signal is decreased, the automatic-gain-control-action of the AGC means 68 on the amplifier 15 causes the terminal 105 and anode of the diode 103 to become more positive and increase the diode conduction. This results in a more rapid increase in bias on the channel limiter amplifier 31, thereby causing the desired reduction in channel gain to be attained more rapidly and effectively.

The additional control effected by the IF amplifier results from the increase in current flow through the cathode resistor 110 of the IF amplifier 15 due to a decrease in the negative bias provided by the AGC diode 68 at low signal levels. The resultant increasing anode current flow through the tube 15 and the cathode resistor 110 causes the positive potential at the terminal 112 to rise increasingly as the signal amplitude decreases. Thus a combined dual control of the gain of the amplifier tube 31 is provided.

From the foregoing description it will be seen that a control circuit for stereophonic radio receivers of the type described may be provided for effective control of the channel gain in combination with tracking control means and circuit elements normally provided, and without involving costly or complicated circuitry. Reduced angle or frequency-modulation channel gain may thus be controlled under weak signal conditions in stereophonic signal receiving systems for carrier signals modulated in both angle and amplitude, to reduce noise effects and improve the overall signal output. While this is accomplished at the expense of stereophonic separation, the latter is of limited advantage at the relative low signal levels, and therefore such FM channel gain control is not only permissible but desirable, as provided by the present system.

Having described the invention, what is claimed is:

1. In a receiving system for radio carrier signals modulated in both angle and amplitude, the combination with an intermediate-frequency amplifier, of amplitude-modulation and angle-modulation signal channels coupled to said amplifier to receive amplified signals therefrom, said angle-modulation channel including a limiter amplifier circuit followed by an angle-modulation detector, a control circuit connected with the limiter amplifier circuit to apply a variable potential thereto for tracking the output signal amplitudes of said channels with variations in applied signal strength, said limiter amplifier circuit including a terminal and being responsive to the application of potential of a predetermined polarity to reduce the gain thereof, means for developing a control voltage of said predetermined polarity which increases in amplitude as the average level of said radio carrier signals decrease, switching means responsive to control voltages above a predetermined amplitude to apply said control voltage to said terminal whereby the gain of said limiter amplifier circuit is reduced.

2. In a receiving system for radio carrier signals modulated in both angle and amplitude, the combination with a signal amplifier having a positive circuit terminal which varies in voltage in response to applied signal strength variations, of an amplitude-modulation and an angle-modulation signal channel coupled to said amplifier, said angle-modulation channel including a limiter amplifier circuit followed by an angle-modulation detector, a channel amplitude-tracking control circuit connected with the limiter amplifier circuit to apply a control potential thereto with variations in applied signal strength whereby the channel gain increases with increases in signal strength, said limiter amplifier circuit including a resistor connected as a variable bias source therefor having a positive-going end responsive to increases in signal strength, an operating-current supply circuit for said system having a positive terminal connected with said signal amplifier terminal through resistive circuit means, a control diode having an anode connected with said operating-current supply circuit terminal and a cathode connected with the positive-going end of said resistor in the limiter amplifier circuit for conduction to and supplemental current flow through said resistor in response to operation of said system at low signal strengths, thereby to effect substantially angle-modulation-channel cut off and reduce noise effects in signal reproduction at low signal strengths.

3. In a receiving system for radio carrier signals modulated in both angle and amplitude, the combination with a signal amplifier having a positive circuit terminal which varies in voltage in response to applied signal strength variations, of an amplitude-modulation and an angle-modulation signal channel coupled to said amplifier, said angle-modulation channel including a limiter-amplifier circuit followed by an angle-modulation detector, a channel amplitude-tracking control circuit connected with the limiter-amplifier circuit to apply a gain-control potential thereto with variations in applied signal strength, said limiter amplifier circuit including an electronic amplifier tube having a cathode resistor connected as a bias source therefor, an operating-current supply circuit for said system having a positive terminal direct-current-conductively connected with said signal amplifier terminal, series resistance means in said connection, a control diode connected between said operating-current supply circuit terminal and the positive end of said cathode resistor, said diode having an anode and a cathode and having the anode connected with said supply circuit terminal for conduction to and supplemental current flow through said cathode resistor in response to operation of said system at low signal strengths, whereby signal translation through the angle-modulation channel is reduced to reduce effects at low signal strengths.

4. In a stereophonic radio receiver for concurrently amplitude and angle-modulated carrier signals, the combination with a signal amplifier and separate amplitude-modulation and angle-modulation signal channels coupled to said amplifier, of angle-modulation detector means in the angle-modulation signal channel, means providing direct-current source having a positive terminal with respect to ground for said receiver, a second signal amplifier in the angle-modulation channel preceding said detector means, said second amplifier including an amplifier device having a bias resistor with a terminal positive with respect to said receiver ground, a diode having an anode connected with said positive terminal and a cathode connected with the positive terminal of said bias resistor, and a tracking control circuit connected for applying a control voltage to said second signal amplifier to reduce the channel gain and the positive voltage at the cathode terminal with reduced signal strength, whereby the diode conducts below a predetermined signal level to apply additional current to said bias resistor and thereby to further reduce the channel gain and undesired noise effects in the operation of said receiver.

5. In a stereophonic radio receiver for concurrently amplitude and angle-modulated carrier signals, the combination with a signal amplifier and separate amplitude-modulation and angle-modulation signal channels coupled to said amplifier, of angle-modulation detector means in the angle-modulation signal channel, means in said signal amplifier providing a direct-current control-voltage source having a terminal positive with respect to ground for said receiver and variable in response to variations in the average amplitude of an applied signal, a second signal amplifier in the angle-modulation channel preceding said detector means, said second amplifier including an amplifier device having a bias resistor with a positive terminal with respect to said receiver ground, a voltage-supply lead positive with respect to said receiver ground, a diode having an anode connected with said positive first amplifier terminal and a cathode connected with said positive terminal of the cathode resistor, said connections being direct-current-conductive and including a first series voltage-dropping resistor between said diode anode and said first amplifier terminal and a second series voltage-dropping resistor between said diode anode and said positive voltage supply lead, and a tracking control circuit connected for applying a variable control voltage to said second signal amplifier to reduce the channel gain and the positive voltage at the cathode terminal with reduced signal strength, whereby the diode conducts below a predetermined signal level to apply additional current to said bias resistor and thereby further reduce the channel gain and undesired noise effects in the operation of said receiver.

6. In a stereophonic radio receiver for concurrently amplitude and angle-modulated carrier signals, the combination with a signal amplifier having automatic-gain-control means and separate amplitude-modulation and angle-modulation signal channels coupled to said amplifier, of angle-modulation detector means in the angle-modulation signal channel, means connected with said signal amplifier providing a positive control voltage with respect to common ground for said receiver variable in response to automatic-gain-control action resulting from variations in the average amplitude of an applied signal, a second signal amplifier in the angle-modulation channel, said second amplifier including an amplifier device having a bias resistor with a positive terminal with respect to common ground for said receiver connected with said positive control-voltage means, variable-conduction means in said connection providing controlled current conduction from said positive control-voltage means to said positive terminal of the bias resistor, and a tracking control circuit connected for applying a variable control voltage to said second amplifier to control the channel gain and reduce the positive voltage at the bias-resistor terminal relative to that of said control-voltage means with reduced signal strength below a predetermined level, whereby said variable-conduction means conducts to increase the bias on said device and reduce the channel gain and noise effects in the operation of said receiver at relatively low signal strengths.

7. In a receiving system for radio carrier signals modulated in both angle and amplitude with stereophonic information, the combination with signal selecting and amplifying means including an automatic-gain-controlled intermediate-frequency electronic amplifier having a positive cathode terminal which varies in voltage in response to applied signal strength variations, and an amplitude-modulation signal-translating channel coupled to said amplifier and including an envelope detector, of an angle-modulation signal channel coupled to said amplifier and including a limiter amplifier circuit followed by an angle-modulation detector, a control circuit connected with the limiter amplifier circuit to apply a variable potential thereto for tracking the output signal amplitude of the angle-modulation channel with the output signal amplitude of the amplitude-modulation channel with variations in applied signal strength, said limiter amplifier circuit including an electronic amplifier tube having a cathode resistor with a positive cathode terminal connected in said control circuit, means including a resistor network providing a positive potential-supply terminal with respect to common ground for said receiver, a diode connected between said potential-supply terminal and the positive cathode terminal of the limiter amplifier tube, said diode being cutoff at signal amplitudes above a predetermined level and connected to provide direct-current conduction to and supplemental current flow through said cathode resistor from said potential-supply terminal in response to operation of said system at low signal strengths below said level, whereby said cathode resistor provides an increased bias voltage for substantially cutting off the angle-modulation channel at low signal strengths.

8. In a receiving system for radio carrier signals modulated in both angle and amplitude with stereophonic information, the combination with a signal amplifier having automatic-gain-control means and a positive circuit terminal which varies in voltage in response to applied signal strength variations, of means providing amplitude-modulation and angle-modulation signal channels coupled to said amplifier, said angle-modulation channel including a limiter amplifier circuit followed by an angle-modulation detector, a control circuit connected with the limiter amplifier circuit to apply a variable potential thereto for tracking the output signal amplitudes of said channels with variations in applied signal strength, said limiter amplifier circuit including an electronic amplifier tube having a cathode resistor connected as a variable bias source in said control circuit, means providing a positive potential-supply terminal, series resistor means connecting said potential supply terminal with the positive circuit terminal of said signal amplifier to receive signal-variable positive voltage variations therefrom, a diode connected between said potential-supply terminal and the positive cathode end of said cathode resistor, said diode being cutoff at signal amplitudes above a predetermined level and connected to provide supplemental current flow through and potential drop in said cathode resistor in response to operation of said system at low signal strengths below said level, thereby to substantially cutoff the angle-modulation channel low signal strengths.

9. In a receiving system for radio carrier signals modulated in both angle and amplitude with stereophonic information, the combination with an automatic-gain-controlled intermediate-frequency electronic amplifier having a cathode resistor the positive cathode terminal of which varies in voltage in response to applied signal strength variations, of amplitude-modulation and angle-modulation signal channels coupled to said amplifier, said angle-modulation channel including a limiter amplifier circuit followed by an angle-modulation detector, a control circuit connected with the limiter amplifier circuit to apply a variable potential thereto for tracking the output signal amplitudes of said channels with variations in applied signal strength, said limiter amplifier circuit including an electronic amplifier tube having a cathode resistor with a positive cathode terminal connected as a variable negative bias source in said control circuit responsive to variations in said tracking control potential, voltage divider means including a pair of series-connected resistor elements providing a positive potential-supply terminal at the junction of said elements, series resistor means connecting said potential-supply terminal with the positive terminal of the cathode resistor of the intermediate-frequency amplifier to receive signal-variable positive voltage variations therefrom, a diode connected between said potential-supply terminal and the positive cathode terminal of the limiter amplifier tube, said diode being connected to provide supplemental current flow through and potential drop in said cathode resistor in response to operation of said system at low signal strengths below a predetermined level, thereby increasing the bias on the limiter amplifier tube to reduce the gain of the angle-modulation channel for reduced noise effects in the operation of said system.

10. In a stereophonic radio signal receiving system for carrier signals modulated in both angle and amplitude with stereophonic sound-signal information, the combination with signal selecting and amplifying means, of an automatic-gain-controlled intermediate-frequency amplifier having an electronic amplifier tube, a cathode resistor for said tube having a positive terminal which varies in voltage with respect to common circuit ground for said system in response to signal strength variations at said amplifier, an amplitude-modulation signal channel coupled to said intermediate-frequency amplifier and including an amplitude-modulation envelope detector, an angle-modulation signal channel coupled to said amplifier and including a limiter amplifier circuit followed for signal translation by an angle-modulation detector, a tracking control circuit connected with the limiter amplifier circuit to apply a variable control potential thereto for tracking the output signal amplitude of the angle-modulation channel with the output signal amplitude of the amplitude-modulation channel as the signal strength of a receiver carrier wave varies, said limiter amplifier circuit including an electronic amplifier tube having a cathode resistor connected as a variable negative bias source therefor which is responsive to variations in said tracking control potential, said cathode resistor having a positive terminal and a negative terminal connected to common circuit ground for said system, voltage-divider resistor means having an intermediate positive supply terminal and a negative end connected with the positive cathode terminal of the intermediate frequency amplifier tube, and a diode connected between said intermediate positive supply terminal and the positive terminal of the limiter amplifier tube, said diode being connected to conduct current from the positive supply terminal to said positive terminal and provide supplemental current flow to and potential drop in said cathode resistor in response to operation of said system at low signal strengths below a predetermined level, thereby increasing the bias on the limiter amplifier tube to reduce the gain of the angle-modulation channel for reduced noise effects in the operation of said system.

11. In a stereophonic radio signal receiving system for carrier signals modulated in both angle and amplitude with stereophonic sound-signal information, the combination with signal-selecting and amplifying means, of an automatic-gain-controlled intermediate-frequency amplifier having an electronic amplifier tube, a cathode resistor for said tube having a positive terminal which varies in voltage in response to signal strength variations at said amplifier, an amplitude-modulation signal channel coupled to said intermediate-frequency amplifier and including an amplitude-modulation envelope detector, an angle-modulation signal channel coupled to said amplifier and including a limiter amplifier circuit followed by an angle-modulation detector, a tracking control circuit connected with the limiter amplifier circuit to apply a variable control potential thereto for tracking the output signal amplitude of the angle-modulation channel with the output signal amplitude of the amplitude-modulation channel as the signal strength of a received carrier wave varies, said limiter amplifier circuit including an electronic amplifier tube having a cathode resistor connected as a variable negative bias source in said control circuit which is responsive to variations in said tracking control potential, said cathode resistor having a positive terminal and a negative terminal connected to common circuit ground means for said receiving system, an operating-current supply circuit including a series voltage-dropping resistor and a positive supply terminal connected therewith, said supply terminal being direct-current-conductively connected with the positive terminal of the intermediate-frequency amplifier tube, a voltage-dropping resistor in said connection, and a diode connected between said supply terminal and the positive cathode terminal of the limiter amplifier tube, said diode being connected to conduct current from the supply terminal to the positive terminal of the cathode resistor of the limiter amplifier tube and providing supplemental current flow to and potential drop in said cathode resistor in response to operation of said system at low signal strengths below a predetermined level, thereby increasing the bias on the limiter amplifier tube to reduce the gain of the angle-modulation channel for reduced noise effects in the operation of said system.

References Cited in the file of this patent

UNITED STATES PATENTS 2,512,530 O'Brien et al. ---------- June 20, 1950